(12) United States Patent
Luo

(10) Patent No.: US 11,841,417 B2
(45) Date of Patent: Dec. 12, 2023

(54) SPEED MEASUREMENT AND POSITIONING METHOD, AND TERMINAL

(71) Applicant: XI'AN ZHONGXING NEW SOFTWARE CO., LTD., Xi'an (CN)

(72) Inventor: Yibao Luo, Guangdong (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 359 days.

(21) Appl. No.: 17/293,035

(22) PCT Filed: Nov. 29, 2019

(86) PCT No.: PCT/CN2019/121830
§ 371 (c)(1),
(2) Date: May 11, 2021

(87) PCT Pub. No.: WO2020/119473
PCT Pub. Date: Jun. 18, 2020

(65) Prior Publication Data
US 2021/0405176 A1    Dec. 30, 2021

(30) Foreign Application Priority Data

Dec. 11, 2018 (CN) .......................... 201811512675.9

(51) Int. Cl.
*G01S 1/60* (2006.01)
*H04W 4/02* (2018.01)
*G01S 13/58* (2006.01)
*H04W 56/00* (2009.01)

(52) U.S. Cl.
CPC .............. *G01S 13/583* (2013.01); *G01S 1/60* (2013.01); *H04W 4/027* (2013.01); *H04W 56/001* (2013.01); *H04W 56/0035* (2013.01)

(58) Field of Classification Search
CPC ...... G01S 13/583; G01S 1/60; H04W 56/001; H04W 56/0035; H04W 4/027
USPC ......................................................... 455/456.1
See application file for complete search history.

(56) References Cited

U.S. PATENT DOCUMENTS

2016/0291131 A1* 10/2016 McAleenan .......... G01S 7/4008

FOREIGN PATENT DOCUMENTS

| CN | 1849526 A | 10/2006 |
|---|---|---|
| CN | 202093170 U | 12/2011 |

* cited by examiner

Primary Examiner — Ted M Wang

(57) ABSTRACT

Embodiments of the present disclosure relate to wireless communication field and disclose a method for speed measurement and positioning and a terminal. The speed measurement and positioning method in the present disclosure applied to a receiving end comprises: when it is determined that the local oscillation frequency of the receiving end is the same as that of each transmitting end, receiving a test signal transmitted by at least one transmitting end; determining frequency difference between the frequency of the test signal and the local oscillation frequency of the receiving end; determining, according to the frequency difference, the relative speed between the receiving end and the transmitting end corresponding to the test signal; and determining, according to the determined relative speed and first position information of the transmitting end corresponding to the test signal, second position information of the receiving end relative to the transmitting end corresponding to the test signal.

10 Claims, 6 Drawing Sheets

SPEED MEASUREMENT AND POSITIONING METHOD, AND TERMINAL

This application claims the priority of Chinese patent application CN 201811512675.9, entitled "Speed Measurement and Positioning Method, and Terminal" and filed on Dec. 11, 2018, the entirety of which is incorporated herein by reference.

FIELD OF THE INVENTION

The present disclosure relates to the field of wireless communication, and in particular, to a speed measurement and positioning method and a terminal.

BACKGROUND OF THE INVENTION

Doppler Effect refers to the difference between a vibration frequency received by an observer and a frequency emitted by a vibration source during relative movement between the vibration source, such as sound, light, and radio wave, and the observer at a relative speed. Since this phenomenon was first discovered by an Austrian scientist Doppler, Christian Johann, it is called Doppler Effect. Frequency change caused by the Doppler Effect is called Doppler Shift, which is proportional to the relative speed and is inversely proportional to the vibration frequency.

The Doppler speed measurement and positioning system is a system which uses the Doppler Effect of microwaves to perform speed measurement, distance measurement, and positioning, for example, a traffic speed measurement radar. The working principle of the traffic speed measurement radar is as follows. When an object moves towards an antenna of a radar, a frequency of a reflection signal reflected by the object is higher than a frequency of a transmitter of the radar; and on the contrary, when the object moves away from the antenna of the radar, a frequency of a reflection signal reflected by the object is lower than the frequency of the transmitter of the radar. In this way, a frequency difference between the frequency of the transmitter of the radar and the frequency of the reflection signal is used to calculate a relative speed between the object and the radar, and further a distance between the object and the radar can also be calculated so as to locate the object.

The inventor has found that at least the following problems exist in some situations. Currently, traffic speed measurement radars usually use millimeter waves to perform speed measurement. However, when using the radar to perform speed measurement, it is required that the object can reflect a signal, and thus the object should be made of metal. Moreover, in order to ensure that the radar can receive the reflection signal reflected by the object, it is required that the object should have a large reflection area. The above problems greatly limit usage of the speed measurement and positioning system.

SUMMARY OF THE INVENTION

Embodiments of the present disclosure aim to provide a speed measurement and positioning method and a terminal, so as to make it possible to perform ranging and positioning to an object at any distance and expand the application scope of ranging and positioning.

In order to solve the above technical problems, embodiments of the present disclosure provide a speed measurement and positioning method, which is applied to a receiving end. The speed measurement and positioning method includes steps of: receiving, when it is determined that a local oscillation frequency of the receiving end is the same as a local oscillation frequency of each of transmitting ends, a test signal transmitted by at least one transmitting end; determining a frequency difference between a frequency of the test signal and the local oscillation frequency of the receiving end; determining, based on the frequency difference, a relative speed between the receiving end and the transmitting end corresponding to the test signal; and determining, based on the determined relative speed and first position information of the transmitting end corresponding to the test signal, second position information of the receiving end relative to the transmitting end corresponding to the test signal.

Embodiments of the present disclosure further provide a speed measurement and positioning method, which is applied to a transmitting end. The speed measurement and positioning method includes steps of: determining that a local oscillation frequency of the transmitting end is the same as a local oscillation frequency of a receiving end; and transmitting a test signal to the receiving end. Second position information of the receiving end is determined based on a frequency of the test signal received by the receiving end, the local oscillation frequency of the receiving end, and first position information of the transmitting end.

Embodiments of the present disclosure further provide a terminal. The terminal includes: at least one processor; and a memory which is in communication connection with the at least one processor. The memory stores instructions executable by the at least one processor, and the instructions executed by the at least one processor, so as to enable the at least one processor to implement the above speed measurement and positioning method which is applied to a receiving end.

Embodiments of the present disclosure further provide a terminal. The terminal includes: at least one processor; and a memory which is in communication connection with the at least one processor. The memory stores instructions executable by the at least one processor, and the instructions are executed by the at least one processor, so as to enable the at least one processor to implement the above speed measurement and positioning method which is applied to a transmitting end.

BRIEF DESCRIPTION OF THE DRAWINGS

One or more embodiments are exemplarily described with reference to corresponding accompanying drawings, and the exemplary description does not constitute limitation to the embodiments. In the accompanying drawings, elements having the same reference numerals are similar elements. Unless otherwise stated, proportions used in the accompanying drawings do not constitute limitations.

DETAILED DESCRIPTION OF THE EMBODIMENTS

In order to make the objectives, technical solutions, and advantages of embodiments of the present disclosure clearer, respective embodiments of the present disclosure will be described in detail with reference to the accompanying drawings. However, those of ordinary skill in the art can understand that many technical details are described in respective embodiments of the present disclosure for better understanding of the present disclosure by a reader. Nonetheless, even without these technical details and various changes and modifications based on the following respective embodiments, the technical solutions claimed in the present disclosure may still be implemented.

Figure 1:
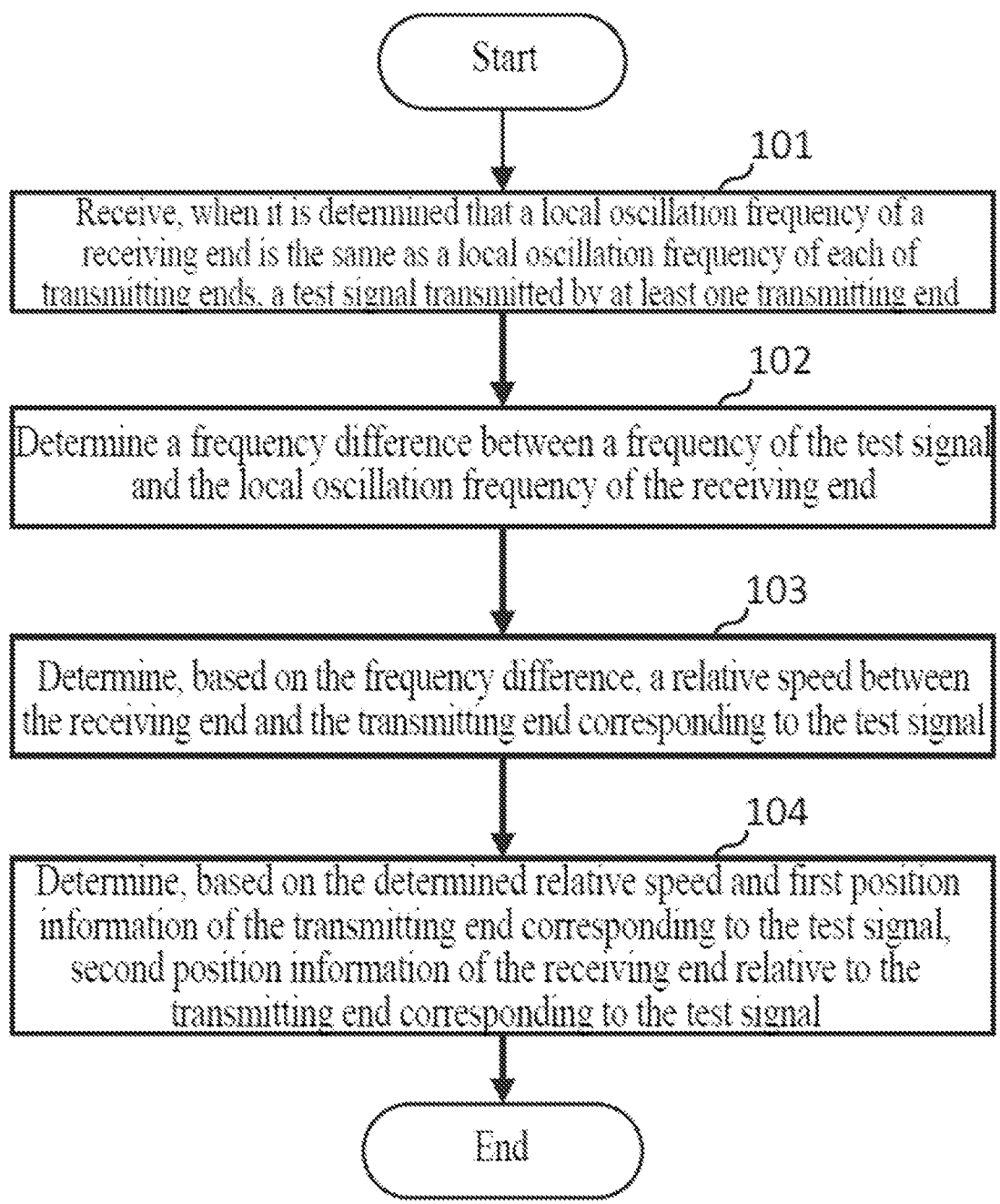
FIG. 1 is a flowchart of a speed measurement and positioning method provided according to a first embodiment of the present disclosure.

A first embodiment of the present disclosure relates to a speed measurement and positioning method. The speed measurement and positioning method is applied to a receiving end, and the receiving end may be a terminal, such as a smart phone, an electronic vehicle-mounted device, a positioning device, and the like. The process of the speed measurement and positioning method is shown in FIG. 1.

At step 101, when it is determined that a local oscillation frequency of the receiving end is the same as a local oscillation frequency of each of transmitting ends, a test signal transmitted by at least one transmitting end is received.

The transmitting end may be a terminal device, such as a smart phone and a vehicle-mounted device, and the transmitting end may also be a communication base station. According to the Doppler Effect, when the receiving end moves relative to the transmitting end, there is a frequency difference between a frequency of the test signal received by the receiving end and a local oscillation frequency of the receiving end. In order to ensure accuracy of second position information of the receiving end determined subsequently, the test signal used in the present embodiment is a millimeter-wave signal. For example, if the transmitting end is a base station device, a 5G network may be used to transmit a millimeter wave as a test signal for speed measurement and positioning.

It can be understood that there may be multiple transmitting ends. For example, if the transmitting ends are base station devices, then each of base stations may be used as the transmitting end to transmit a test signal to the receiving end.

It should be noted that, if it is determined that a clock signal of the receiving end is synchronized with a clock signal of each of transmitting ends, then it may be determined that the local oscillation frequency of the receiving end is the same as the local oscillation frequency of each of the transmitting ends. Accordingly, before it is determined that the local oscillation frequency of the receiving end is the same as the local oscillation frequency of each of the transmitting ends, clock synchronization is performed between the receiving end and each of the transmitting ends, so as to enable the local oscillation frequency of the receiving end to be the same as the local oscillation frequency of each of the transmitting ends.

There are many manners for performing clock synchronization between the receiving end and each of the transmitting ends, and a suitable manner for performing synchronization may be selected according to actual use.

In an implementation manner, a fundamental frequency signal of a clock synchronization unit in each of the transmitting ends is acquired, and based on the fundamental frequency signal, a clock signal of the receiving end synchronized with each of the transmitting ends is generated.

Clock synchronization among respective transmitting ends can be realized through a network system of the transmitting ends. After clock synchronization among the transmitting ends is completed, any of the transmitting ends transmits a fundamental frequency signal of its clock synchronization unit to the receiving end. Due to existence of the Doppler Effect, after the receiving end receives the fundamental frequency signal, the fundamental frequency signal received may be corrected by means of a communication protocol which is not described in detail herein. A fundamental frequency signal corrected is used as a clock source of local oscillation of the receiving end, and further a clock signal of the receiving end synchronized with each of the transmitting ends is generated, so as to realize clock synchronization between the receiving end and each of the transmitting ends.

In another implementation manner, a clock signal distributed by a clock synchronization device is acquired, and herein the clock signal acquired is the same as a clock signal distributed by the clock synchronization device to each of the transmitting ends.

The transmitting ends and the receiving end receive a clock signal distributed by the clock synchronization device at the same time. The clock synchronization device may use a timing system (for example, a GPS timing system), and the timing system may distribute the same clock signal to the transmitting ends and the receiving end. For example, the time system distributes the clock signal to the transmitting ends and the receiving end through a power divider. Since a synchronized clock signal is used, clock synchronization between the receiving end and each of the transmitting ends is realized.

It is certain that other manners of clock synchronization may also be used, and they will not be listed one by one in the present embodiment.

It should be noted that, after clock synchronization is realized between the receiving end and the transmitting ends, it can be determined that the local oscillation frequency of the receiving end is the same as the local oscillation frequency of the transmitting ends. At this time, the test signal transmitted by a transmitting end may be received.

At step 102, a frequency difference between a frequency of the test signal and the local oscillation frequency of the receiving end is determined.

A mixer may be used to determine the frequency difference between the frequency of the test signal and the local oscillation frequency of the receiving end. It should be understood that, the receiving end uses a receiving antenna to receive the test signal, and processes the test signal (for example, the test signal passes through a filter and a lownoise amplifier). A test signal after the processing and a local oscillation signal of the receiving end are used as input signals of the mixer and pass through the mixer, and then the frequency difference between the frequency of the test signal and the local oscillation frequency of the receiving end can be determined.

At step 103, based on the frequency difference, a relative speed between the receiving end and the transmitting end corresponding to the test signal is determined.

Since the local oscillation frequency of the receiving end is the same as the local oscillation frequency of the transmitting end and a transmitting frequency at which the transmitting end transmits the test signal is the oscillation frequency of the transmitting end, the local oscillation frequency of the receiving end may be used as the transmitting frequency at which the test signal is transmitted. According to the Doppler Effect, based on a frequency difference between a frequency at which the test signal is received and the local oscillation frequency of the receiving end, the relative speed between the receiving end and the transmitting end which transmits the test signal is obtained by calculating. The calculation manner is a common one, and will not be described in detail herein.

At step 104, based on the determined relative speed and first position information of the transmitting end corresponding to the test signal, second position information of the receiving end relative to the transmitting end corresponding to the test signal is determined.

Based on the determined relative speed and by using a time difference between a time at which the test signal is transmitted and a time at which the test signal is received, a distance between the receiving end and the transmitting end corresponding to the test signal can be determined. It should be understood that the receiving end may acquire first position information of the transmitting end corresponding to the test signal, and then determine, based on the first position information and the distance to the transmitting end, second position information of the receiving end relative to the transmitting end corresponding to the test signal.

It should be noted that, before determining the second position information, the first position information of the transmitting end corresponding to the test signal may be acquired. The first position information may be transmitted by the transmitting end to the receiving end. For example, when transmitting the test signal, the transmitting end transmits its first position information to the receiving end at the same time. The first position information may also be acquired by the receiving end from a server. For example, the transmitting end transmits its ID number to the receiving end, and the receiving end acquires the first position information of the transmitting end from the server according to the ID number. It can be understood that, the receiving end for implementing the speed measurement and positioning method may communicate with the server, and it is certain that the receiving end may not communicate with the server. In actual application, a choice can be made according to actual needs.

It should be noted that, if the receiving end acquires test signals transmitted by multiple transmitting ends, multiple pieces of second position information relative to the transmitting ends which transmit the test signals can be determined. That is, the receiving end may obtain, by calculating, multiple pieces of second position information of the receiving end. The receiving end may obtain, by calculating, a weighted average of all pieces of determined second position information by means of the weighted averaging manner, and use the weighted average as precise position information of the receiving end.

In view of some situations for implementations of the present disclosure, in actual application of speed measurement and positioning with a radar it is required that an object to be detected must be made of metal and the object has a sufficiently large metal area, so as to ensure that the radar receives a reflection signal reflected by the object to be detected; and there must be no obstruction between the object to be detected and the radar, otherwise measurement inaccuracy will be caused. However, in the present embodiment, it is determined that the local oscillation frequency of the receiving end is the same as the local oscillation frequency of each of the transmitting ends, so that accuracy of the frequency difference calculated can be ensured. Since it is not necessary that the receiving end is made of metal, i.e., it is not necessary that the object to be detected is made of metal, the type of the object to be detected is greatly widened. Besides, the receiving end receives a test signal transmitted by the transmitting end, rather than receives a reflected signal, so that determining the second position information of the receiving end is not affected even if there is an obstruction between the receiving end and the transmitting end. In this way, the speed measurement and positioning method is not limited by the site and the distance, which further expands the application scope of this speed measurement and positioning method. In addition, since the manner of relative positioning is used, positioning precision of the object to be detected is greatly improved relative to an existing manner of positioning (for example, the GPS).

Figure 2:
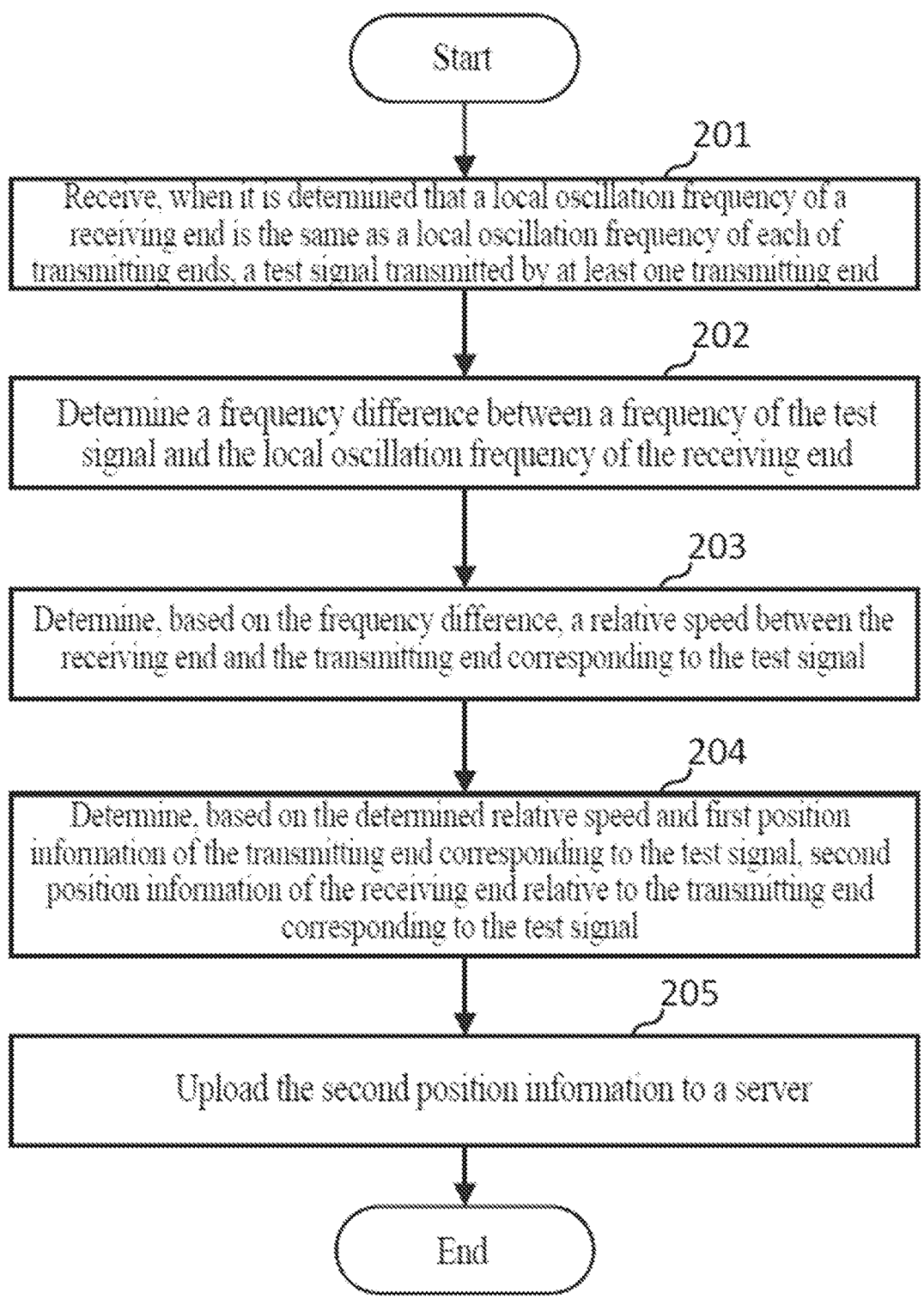
FIG. 2 is a flowchart of a speed measurement and positioning method provided according to a second embodiment of the present disclosure.

A second embodiment of the present disclosure relates to a speed measurement and positioning method. The second embodiment has further improvements over the first embodiment, and the main improvement is as follows. In the second embodiment of the present disclosure, after determining the second position information of the receiving end relative to the transmitting end corresponding to the test signal, the speed measurement and positioning method further includes: uploading the second position information to a server. The process of the speed measurement and positioning method is shown in FIG. 2.

At step 201, when it is determined that a local oscillation frequency of the receiving end is the same as a local oscillation frequency of each of transmitting ends, a test signal transmitted by at least one transmitting end is received. At step 202, a frequency difference between a frequency of the test signal and the local oscillation frequency of the receiving end is determined. At step 203, based on the frequency difference, a relative speed between the receiving end and the transmitting end corresponding to the test signal is determined. At step 204, based on the determined relative speed and first position information of the transmitting end corresponding to the test signal, second position information of the receiving end relative to the transmitting end corresponding to the test signal is determined. At step 205, the second position information is uploaded to a server. Herein, precise position information of the receiving end is determined by the server based on the uploaded second position information.

If the receiving end acquires test signals transmitted by multiple transmitting ends, multiple pieces of second position information relative to transmitting ends which transmit the test signals may be determined. That is, the receiving end may obtain, by calculating, multiple pieces of second position information of the receiving end. Each of the pieces of determined second position information is uploaded to the server. The server may calculate a weighted average of all pieces of second position information uploaded by the receiving end by means of the weighted averaging manner, and use the weighted average as precise position information of the receiving end.

If the receiving end only determines one piece of second position information, the server may also correct the uploaded second position information based on pieces of first position information of multiple transmitting ends by means of the three-point positioning manner. It can be understood that, if the receiving end uploads multiple pieces of second position information, each of the pieces of second position information may be corrected by means of the three-point positioning manner first, and then weighted averaging is performed on each of pieces of corrected second position information, so as to determine precise position information of the receiving end.

At step 206, the precise position information of the receiving end determined by the server is received.

After the receiving end receives the precise position information determined by the server, the receiving end may output the precise position information, for example, by displaying the precise position information on the map.

It should be noted that, step 201 to step 204 in the present embodiment is substantially the same as step 101 to step 104 in the first embodiment, and details will not be described herein.

According to the speed measurement and positioning method provided in the present embodiment, the receiving end uploads the second position information to the server, and the server corrects the uploaded second position information and determines the precise position information of the receiving end. By using the server, the precise position information of the receiving end can be determined quickly, and the precise position information can be acquired without consuming processing resources of the receiving end, so that positioning precision of the receiving end can be further improved.

The above division of various steps of the method is only for the purpose of clear description. In implementation, steps may be combined into one step, or a step may be divided into multiple steps. The division of the steps falls into the protection scope of the present disclosure as long as the same logical relationships are included. Adding inessential modifications or introducing inessential design to the algorithm or the process without changing the core design of the algorithm or the process is also within the protection scope of the present disclosure.

Figure 3:
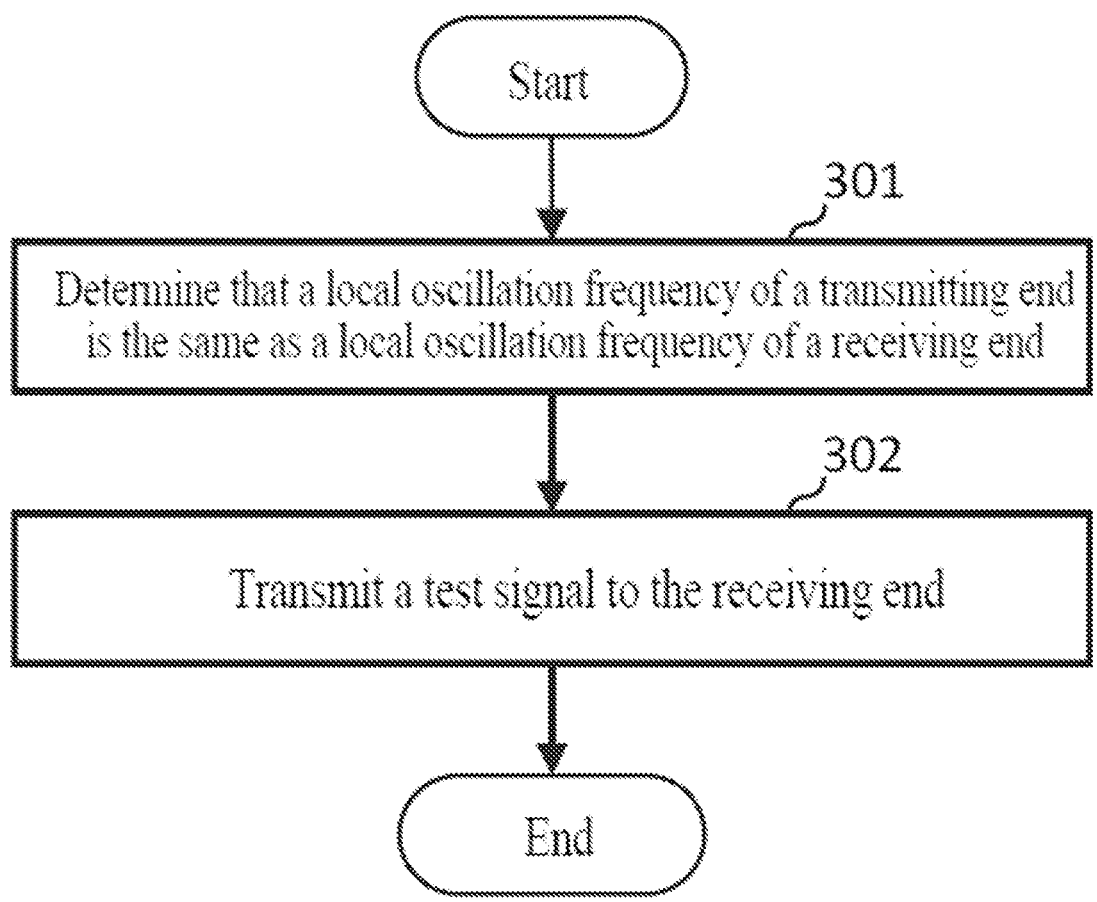
FIG. 3 is a flowchart of a speed measurement and positioning method provided according to a third embodiment of the present disclosure.

A third embodiment of the present disclosure relates to a speed measurement and positioning method, and the speed measurement and positioning method is applied to a transmitting end. The transmitting end may be a base station or a terminal device (such as a smart phone and a vehicle-mounted device). The process of the speed measurement and positioning method is shown in FIG. 3.

At step 301, it is determined that a local oscillation frequency of the transmitting end is the same as a local oscillation frequency of a receiving end.

One transmitting end may transmit a test signal to multiple receiving ends. If it is determined that a clock signal of the transmitting end is synchronized with a clock signal of each of the receiving ends, it may be determined that the local oscillation frequency of the receiving end is the same as the local oscillation frequency of each of the transmitting ends. Synchronizing the clock signal of the transmitting end and the clock signal of the receiving ends is similar to that in the step 101 of the first embodiment. Synchronizing the clock signals may be performed in the following manners: the transmitting end transmits a fundamental frequency signal of its clock synchronization unit to the receiving ends, and each of the receiving ends generates, based on the fundamental frequency signal received, a clock signal synchronized with the transmitting end; or the transmitting end acquires a clock synchronization signal distributed by a clock synchronization device.

Figure 4:
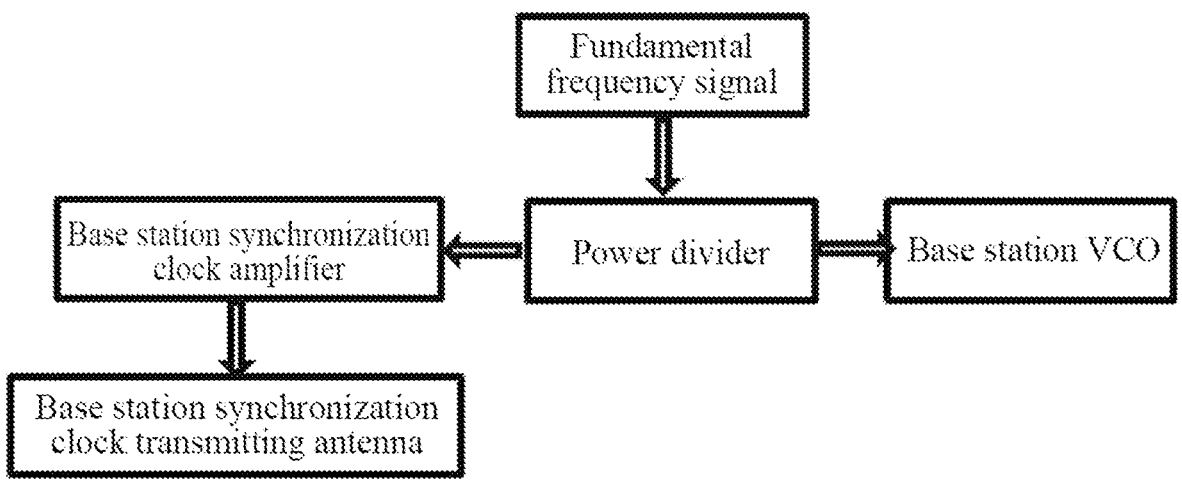
FIG. 4 is a schematic diagram of an internal circuit of a base station according to the third embodiment of the present disclosure.

Taking the base station being the transmitting end as example and with reference to FIG. 4 showing a schematic diagram of an internal circuit of the base station, a process that the transmitting end transmits a fundamental frequency signal so as to realize clock synchronization of the transmitting end and the receiving end is described in detail. It is certain that one receiving end is used for better understanding.

As shown in FIG. 4, FIG. 4 does not show the clock synchronization unit of the base station. A standard clock signal generated after clock synchronization is completed among base stations is used as the fundamental frequency signal of the clock synchronization unit of the base station. The fundamental frequency signal passes through a power divider. One output signal is distributed to a voltage controlled oscillator ("VCO" for short) of the base station for generating a clock signal for communication, and the other output signal is delivered, through a base station synchronization clock amplifier, to a base station synchronization clock transmitting antenna, so as to transmit the fundamental frequency signal to the receiving end through the antenna. The receiving end receives the fundamental frequency signal, corrects the fundamental frequency signal, and transmits the corrected fundamental frequency signal to the VCO of the receiving end, so as to generate a clock signal synchronized with the transmitting end.

Figure 5:
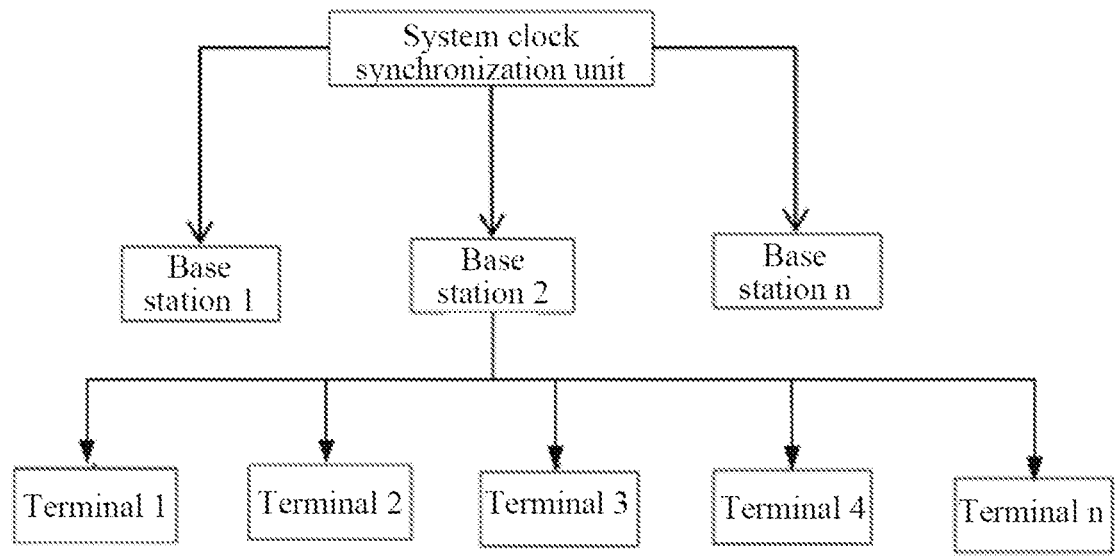
FIG. 5 is a schematic diagram of clock synchronization between a base station and terminals according to the third embodiment of the present disclosure.

It should be noted that, clock synchronization among base stations in the base station system is realized through a cellular system, so as to ensure clock consistency among respective base stations. Since the power divider is used in the base station, a communication function and a speed measurement and positioning function of the base station do not interfere with each other. That is, the base station has two functions, i.e., the communication function and the speed measurement and positioning function, at the same time. The two functions may be implemented at the same time. For example, in the base station, the speed measurement and positioning part and the communication system use corresponding radio frequency channels and antennas respectively, which is suitable for a scenario in which a frequency division duplexing ("FDD" for short) device and a speed measurement and positioning device work simultaneously. The two functions may also be implemented by dividing time slots. For example, the speed measurement and positioning device and the communication system share a radio frequency channel and an antenna, so that a time division duplexing ("TDD" for short) part and a speed measurement and positioning part work simultaneously. In addition, since clock synchronization among respective base stations is realized through a system clock synchronization unit, clock synchronization between the transmitting end and the receiving end can be realized by means of the fundamental frequency signal of the synchronization unit of the base station without additionally adding a clock synchronization device, which greatly reduces the cost. A schematic diagram of clock synchronization between a base station and terminals are shown in FIG. 5. In FIG. 5, for better understanding, it is supposed that all terminals work under a base station 2. It can be seen from FIG. 5 that, the system clock synchronization unit of the base station distributes a fundamental frequency signal to respective base stations, so as to realize clock synchronization among respective base stations, and then the base station 2 distributes the fundamental frequency signal to respective terminals, so as to realize clock synchronization between a terminal communicating with the transmitting end and the base station 2.

Figure 6:
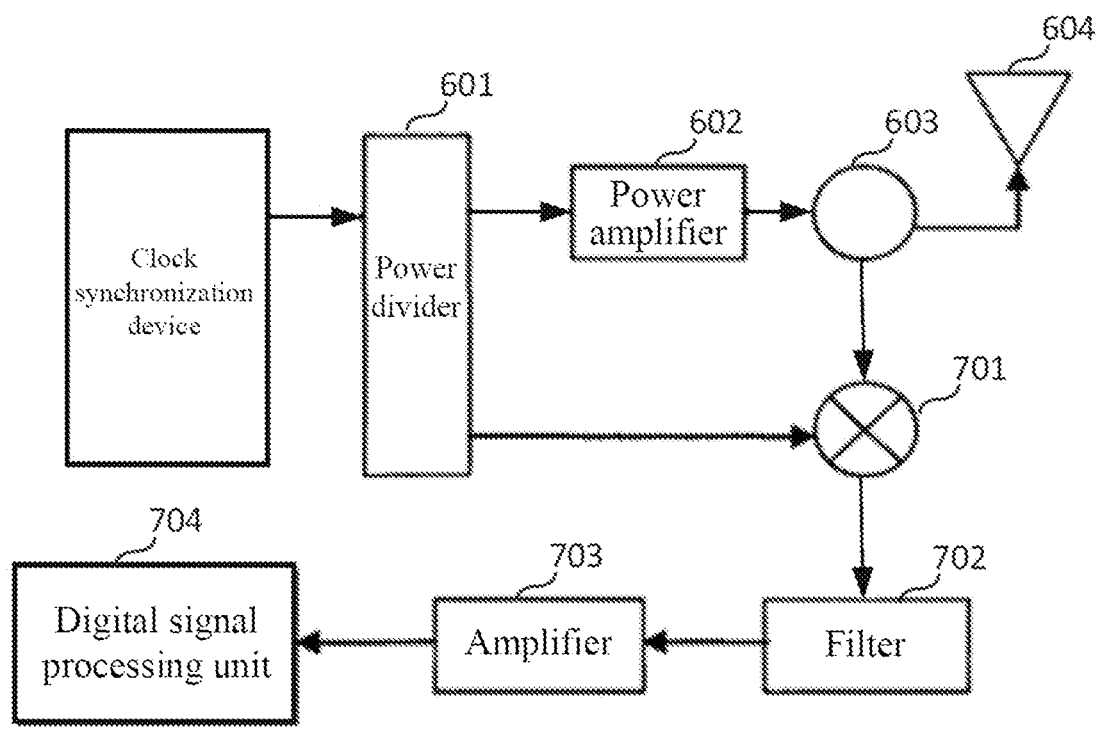
FIG. 6 is a schematic diagram showing distributing a clock signal generated by a clock synchronization device to a transmitting end and a receiving end.

If a clock synchronization device distributes a clock signal to the transmitting end, the clock signal generated by the clock synchronization device is distributed to the transmitting end and the receiving end through a power divider, as shown in FIG. 6. In FIG. 6, the base station being the transmitting end is taken as an example. In FIG. 6, a base station and a terminal are included. A power divider 601, a power amplifier 602, a circulator 603, and an antenna 604 belong to the base station. A mixer 701, a filter 702, an amplifier 703, and a digital signal processing unit 704 belong to the terminal. It can be seen that a clock signal generated by the clock synchronization device is transmitted to the transmitting end and the terminal respectively. The filter 702, the amplifier 703, and the digital signal processing unit 704 in the terminal are common settings in the terminal, and will not be described in detail herein.

At step 302, a test signal is transmitted to the receiving end. Herein, the receiving end determines second position information of the receiving end based on a frequency of the received test signal, a local oscillation frequency of the receiving end, and first position information of the transmitting end.

In the case that clock synchronization of the transmitting end and the receiving end is realized, it is ensured that the local oscillation frequency of the transmitting end is the same as the local oscillation frequency of the receiving end. The transmitting end transmits a test signal to the receiving end, and it is certain that the transmitting end may transmit a test signal to multiple receiving ends. The receiving end may obtain, by calculating, a distance of the receiving end relative to the transmitting end based on the local oscillation frequency of the receiving end and a frequency of the test signal received and according to the Doppler Effect, and may determine second position information of the receiving end according to first position information of the transmitting end. It should be noted that, the first position information of the transmitting end may be acquired by the receiving end from the server.

According to the speed measurement and positioning method, in the case that the local oscillation frequency of the transmitting end is the same as the local oscillation frequency of the receiving end, the transmitting end transmits a test signal. Since the receiving end moves relative to the transmitting end, a second position of the receiving end may be determined according to the Doppler Effect. Since it is not necessary for the transmitting end to receive a reflection wave so as to perform speed measurement and positioning to the receiving end and the receiving end directly receives the test signal so as to determine the second position of the receiving end, application scope of the speed measurement and positioning method is greatly expanded. Besides, since there is no influence from an obstruction or an area of a reflection plane, precision of speed measurement and positioning is improved.

Figure 7:
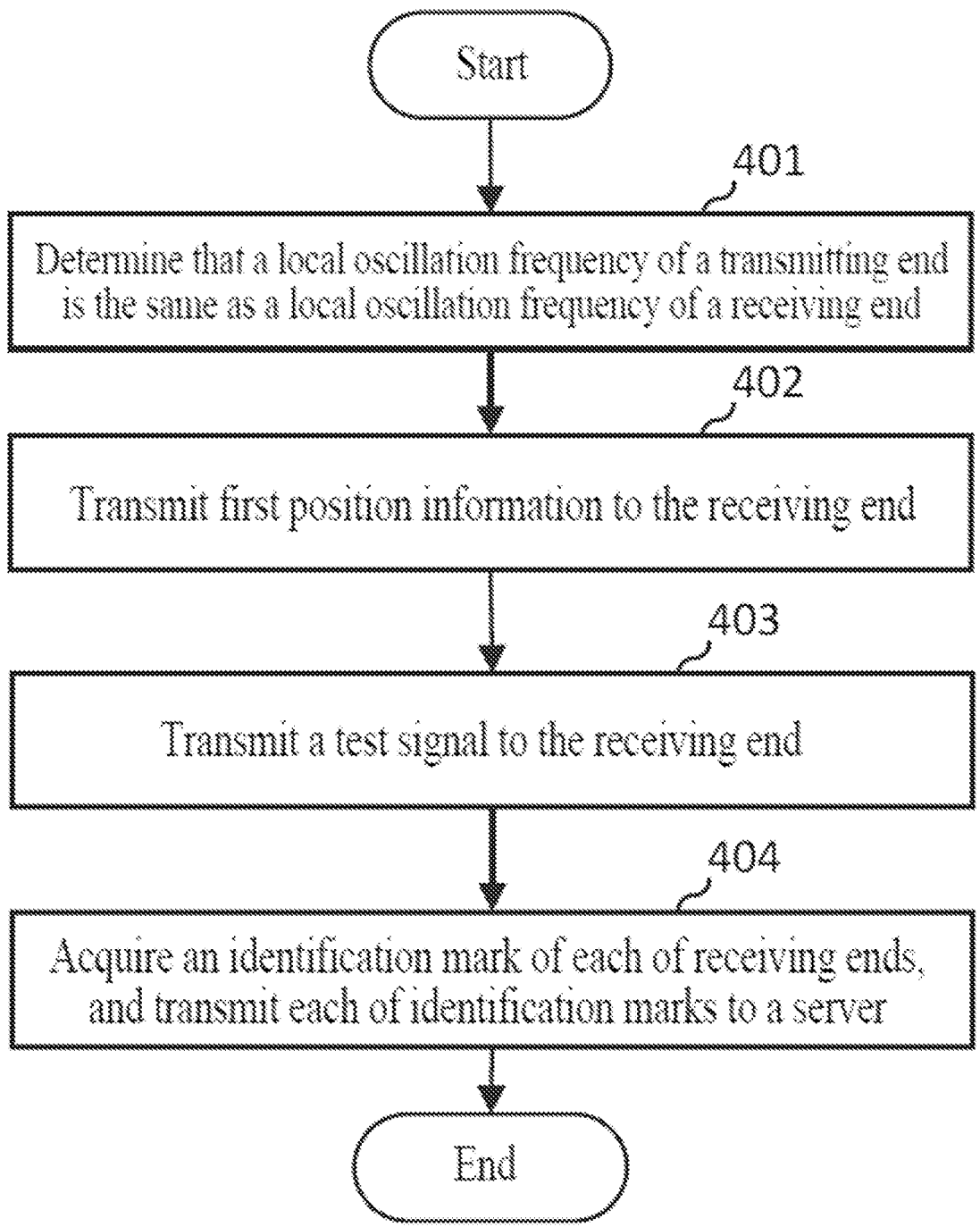
FIG. 7 is a flowchart of a speed measurement and positioning method provided according to a fourth embodiment of the present disclosure.
Figure 8:
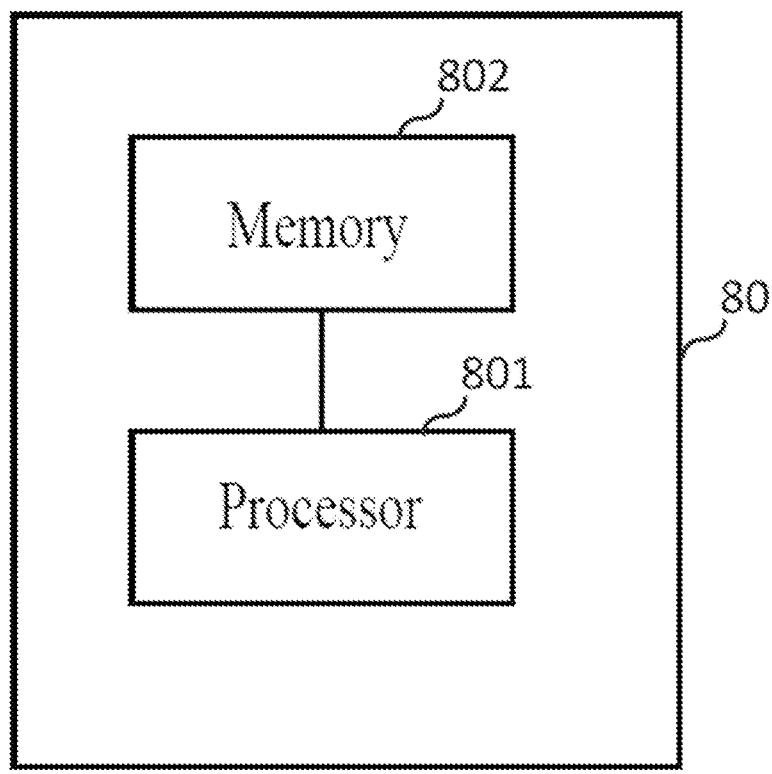
FIG. 8 is a flowchart of a speed measurement and positioning method provided according to a fifth embodiment of the present disclosure.
Figure 9:
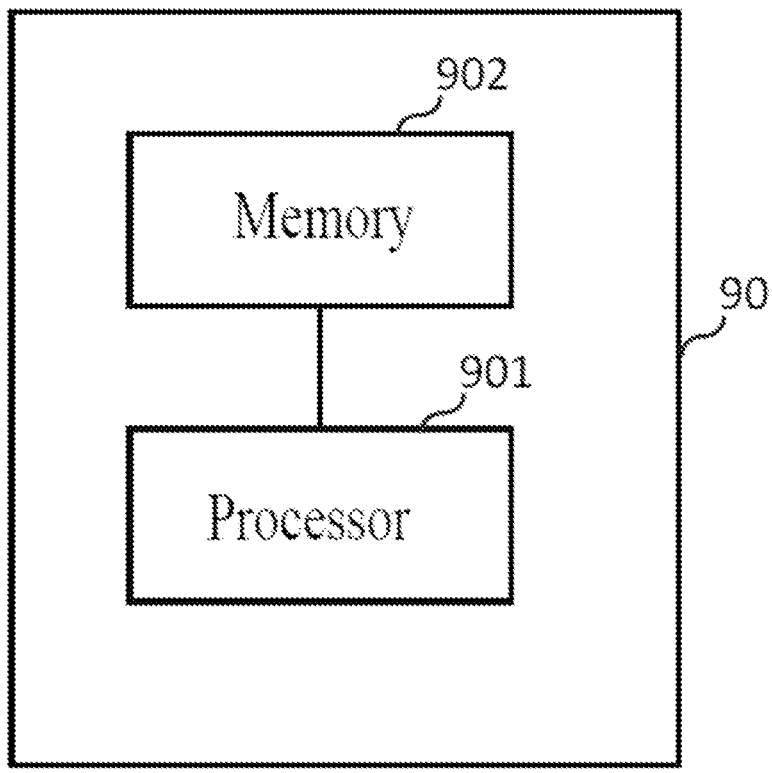
FIG. 9 is a flowchart of a speed measurement and positioning method provided according to a sixth embodiment of the present disclosure.

A fourth embodiment of the present disclosure relates to a speed measurement and positioning method. The fourth embodiment has further improvements over the third embodiment, and the main improvement is as follows. In the fourth embodiment of the present disclosure, after determining the second position information of the receiving end relative to the transmitting end corresponding to the test signal, the speed measurement and positioning method further includes: transmitting the first position information to the receiving end. The process of the speed measurement and positioning method is shown in FIG. 7.

At step 401, it is determined that a local oscillation frequency of a transmitting end is the same as a local oscillation frequency of a receiving end.

At step 402, first position information is transmitted to the receiving end.

To facilitate determining, by the receiving end, the second position information of the receiving end, the transmitting end may transmit its own first position information to the receiving end.

At step 403, a test signal is transmitted to the receiving end. Herein, the receiving end determines second position information of the receiving end based on a frequency of the received test signal, the local oscillation frequency of the receiving end, and first position information of the transmitting end.

At step 404, an identification mark of each of receiving ends is acquired, and each of identification marks is transmitted to a server. Herein, the server identifies the receiving end uploading the first position information according to the identification mark.

If the transmitting end is a base station, an identification mark of each of terminals under this base station can be acquired. It can be understood that, when a terminal is in a working state under the base station, a communication connection is established between the base station and the terminal, and the base station may acquire the unique identification mark of the terminal. Since the transmitting end may transmit a test signal to multiple terminals at the same time, in order to facilitate managing, by a server for speed measurement and positioning, the second position information uploaded by the receiving end, the base station may upload identification marks of the terminals to the server.

According to the speed measurement and positioning method provided in the present disclosure, by transmitting the first position information of the transmitting end to the receiving end, acquisition of the first position information by the receiving end is accelerated, so as to accelerate the speed measurement and positioning. Meanwhile, by transmitting identification marks of receiving ends to the server, the server can manage the second position information of each of receiving ends.

A fifth embodiment of the present disclosure relates to a terminal. The terminal 80 includes: at least one processor 801; and a memory 802 which is in communication connection with the at least one processor 801. The memory 802 stores instructions executable by the at least one processor 801. The instructions are executed by the at least one processor 801, so as to enable the at least one processor 801 to implement the speed measurement and positioning method provided in the first embodiment or the second embodiment.

A sixth embodiment of the present disclosure relates to a terminal. The terminal 90 includes: at least one processor 901; and a memory 902 which is in communication connection with the at least one processor 901. The memory 902 stores instructions executable by the at least one processor 901. The instructions are executed by the at least one processor 901, so as to enable the at least one processor 901 to implement the speed measurement and positioning method provided in the third embodiment or the fourth embodiment.

It should be noted that the memory and the processor in the fifth embodiment or the sixth embodiment are connected through buses. The buses may include any number of interconnected buses and bridges. The buses link various circuits of one or more processors and the memory together. The buses may also link various other circuits, such as a peripheral device, a voltage stabilizer, and power management circuits together. These are commonly known in the art, and thus will not be described in detail herein. A bus interface is provided between a bus and a transceiver. The transceiver may be an element, or may be multiple elements, for example, multiple receivers and transmitters. The transceiver provides a unit for communicating with various other devices over a transmission medium. Data processed by the processor is transmitted over a wireless medium through an antenna. Further, the antenna also receives data and transmits the data to the processor.

The processor is in charge of managing the buses and ordinary processing, and may also provide various functions, including timing, peripheral interface, voltage regulation, power source management, and other control functions. The memory may be used to store data used by the processor when executing operations.

Those skilled in the art may understand that all or part of the steps in each of the methods of the above-mentioned embodiments can be implemented by instructing relevant hardware through a program. The program is stored in a storage medium and includes several instructions to enable a device (which can be a single-chip microcomputer, a chip, etc.) or a processor to execute all or part of the steps in each of the methods described in respective embodiments of the present disclosure. The aforementioned storage medium includes: USB disk, external hard disk, read-only memory (ROM), random access memory (RAM), magnetic disk or optical disk, and other media that can store program codes.

The present embodiment makes it possible to perform speed measurement and positioning to an object at any distance, so as to expand the application scope of the speed measurement and positioning method.

In term of some situations for implementations of present disclosure, in actual application of speed measurement and positioning with a radar, it is required that an object to be detected must be made of metal and the object has a sufficiently large metal area, so as to ensure that the radar receives a reflection signal reflected by the object to be detected; and there must be no obstruction between the object to be detected and the radar, otherwise measurement inaccuracy will be caused. However, in the present embodiment, it is determined that the local oscillation frequency of the receiving end is the same as the local oscillation frequency of each of the transmitting ends, so that accuracy of the frequency difference calculated can be ensured. Since it is not necessary that the receiving end is made of metal, i.e., it is not necessary that the object to be detected is made of metal, the type range of the object to be detected is greatly widened. Besides, the receiving end receives a test signal transmitted by the transmitting end, rather than receives a reflected signal, so that determining the second position information of the receiving end is not affected even if there is an obstruction between the receiving end and the transmitting end. In this way, the speed measurement and positioning method is not limited by the site and the distance, which further expands the application scope of this speed measurement and positioning method. In addition, since the manner of relative positioning is used, positioning precision of the object to be detected is greatly improved relative to an existing manner of positioning (for example, the GPS).

Those of ordinary skill in the art may understand that, the above respective embodiments are embodiments for implementing the present disclosure, but various changes can be made in forms and details in actual application without departing from the spirit and the scope of the present disclosure.

The invention claimed is:

1. A speed measurement and positioning method applied to a receiving end, comprising:
    receiving, when it is determined that a local oscillation frequency of the receiving end is the same as a local oscillation frequency of each of transmitting ends, a test signal transmitted by at least one transmitting end;
    determining a frequency difference between a frequency of the test signal and the local oscillation frequency of the receiving end;
    determining, based on the frequency difference, a relative speed between the receiving end and the transmitting end corresponding to the test signal; and
    determining, based on the determined relative speed and first position information of the transmitting end corresponding to the test signal, second position information of the receiving end relative to the transmitting end corresponding to the test signal.

2. The speed measurement and positioning method according to claim 1, wherein before the step of receiving, when it is determined that the local oscillation frequency of the receiving end is the same as the local oscillation frequency of each of transmitting ends, the test signal transmitted by the at least one transmitting end, the speed measurement and positioning method further comprises:
    performing clock synchronization between the receiving end and each of the transmitting ends, so as to enable the local oscillation frequency of the receiving end to be the same as the local oscillation frequency of each of the transmitting ends.

3. The speed measurement and positioning method according to claim 2, wherein the step of performing clock synchronization between the receiving end and each of the transmitting ends comprises:
    acquiring a clock signal distributed by a clock synchronization device, wherein the acquired clock signal is the same as a clock signal distributed by the clock synchronization device to each of the transmitting ends; or
    acquiring a fundamental frequency signal of a clock synchronization unit in each of the transmitting ends, and generating, based on the fundamental frequency signal, a clock signal of the receiving end synchronized with each of the transmitting ends.

4. The speed measurement and positioning method according to claim 1, wherein before the step of determining the first position information of the receiving end, the speed measurement and positioning method further comprises:
    acquiring the first position information of the transmitting end corresponding to the test signal.

5. The speed measurement and positioning method according to claim 1, wherein after the step of determining the second position information of the receiving end relative to the transmitting end corresponding to the test signal, the speed measurement and positioning method further comprises:
    uploading the second position information to a server, wherein precise position information of the receiving end is determined by the server based on the uploaded second position information; and receiving the precise position information of the receiving end determined by the server.

6. A speed measurement and positioning method applied to a transmitting end, comprising:
   determining that a local oscillation frequency of the transmitting end is the same as a local oscillation frequency of a receiving end; and
   transmitting a test signal to the receiving end,
   wherein second position information of the receiving end is determined based on a frequency of the test signal received by the receiving end, the local oscillation frequency of the receiving end, and first position information of the transmitting end.

7. The speed measurement and positioning method according to claim 6, wherein the speed measurement and positioning method further comprises:
   transmitting the first position information to the receiving end.

8. The speed measurement and positioning method according to claim 7, wherein the speed measurement and positioning method further comprises:
   acquiring an identification mark of each of receiving ends, and transmitting each of identification marks to a server, wherein the server identifies the receiving end uploading the first position information according to the identification mark.

9. A terminal, comprising:
   at least one processor; and
   a memory which is in communication connection with the at least one processor, wherein the memory stores instructions executable by the at least one processor, and the instructions are executed by the at least one processor, so as to enable the at least one processor to implement the speed measurement and positioning method according to claim 1.

10. A terminal, comprising:
    at least one processor; and
    a memory which is in communication connection with the at least one processor, wherein the memory stores instructions executable by the at least one processor, and the instructions are executed by the at least one processor, so as to enable the at least one processor to implement the speed measurement and positioning method according to claim 6.

\* \* \* \* \*